United States Patent [19]
Consiglio et al.

[11] Patent Number: 5,818,923
[45] Date of Patent: Oct. 6, 1998

[54] SYSTEM AND METHOD FOR SUPRESSING PULSE DIALING FEEDBACK OCCURRING PARTICULARLY WITH AUXILIARY ACOUSTIC RINGERS IN SOCKET TELEPHONE SYSTEMS

[75] Inventors: Pietro Consiglio, Milan; Carlo Antonini, Venegono Inferiore, both of Italy

[73] Assignee: STMicroelectronics S.r.l., Agrate Brianza, Italy

[21] Appl. No.: 684,175

[22] Filed: Jul. 19, 1996

[30] Foreign Application Priority Data

Jul. 28, 1995 [EP] European Pat. Off. ............. 95830338

[51] Int. Cl.⁶ ............................ H04M 1/00; H04M 3/00
[52] U.S. Cl. ......................... 379/373; 379/418; 379/375; 379/392
[58] Field of Search ................................... 379/372, 373, 379/375, 387, 418, 179, 180, 181, 159, 164, 374, 422, 33, 392, 410, 406

[56] References Cited

U.S. PATENT DOCUMENTS

| | | | |
|---|---|---|---|
| 626,382 | 6/1899 | Humphrey | 379/373 |
| 2,095,681 | 10/1937 | Squire et al. | 379/373 |
| 4,152,549 | 5/1979 | Ceruti et al. | 379/373 |
| 4,163,873 | 8/1979 | Phelps | 379/375 |
| 4,367,376 | 1/1983 | Proctor et al. | 340/328 |
| 4,431,871 | 2/1984 | Gupta | 379/418 |
| 4,723,275 | 2/1988 | Hirth et al. | 379/361 |
| 4,727,572 | 2/1988 | Whitney | 379/374 |
| 4,922,529 | 5/1990 | Kiel | 379/387 |
| 4,975,949 | 12/1990 | Wimsatt et al. | 379/387 |
| 5,159,627 | 10/1992 | Hama | 379/374 |
| 5,459,783 | 10/1995 | Consiglio et al. | 379/373 |
| 5,461,670 | 10/1995 | Consiglio et al. | 379/387 |
| 5,602,911 | 2/1997 | Ost, Sr. | 379/376 |
| 5,602,914 | 2/1997 | Andreini et al. | 379/422 |
| 5,606,593 | 2/1997 | Smith | 379/33 |

FOREIGN PATENT DOCUMENTS 0 556 742   8/1993   European Pat. Off. ......... H04M 1/74

OTHER PUBLICATIONS

European Search Report from European Patent Application 95830338.0, filed Jul. 28, 1995.

*Primary Examiner*—Jack Chiang
*Attorney, Agent, or Firm*—Wolf, Greenfield & Sacks, P.C.

[57] ABSTRACT

An acoustic feedback suppression system, particularly for auxiliary ringers in socket telephone systems, comprising a first terminal and a second terminal of a telephone line, an internal ringer, and an auxiliary ringer that is connected between the first and second telephone lines. The system comprises an activation circuit adapted to activate first and second switching circuits to reduce the voltage at the terminals of the auxiliary ringer, the activation circuit being controlled by an activation signal generated by a control and signaling circuit when a user dials a telephone number.

51 Claims, 4 Drawing Sheets

SYSTEM AND METHOD FOR SUPRESSING PULSE DIALING FEEDBACK OCCURRING PARTICULARLY WITH AUXILIARY ACOUSTIC RINGERS IN SOCKET TELEPHONE SYSTEMS

BACKGROUND OF THE INVENTION

1. Field of the Invention

The present invention relates to an acoustic feedback suppression system, particularly for auxiliary ringers in socket telephone systems.

2. Discussion of the Related Art

It is known that in socket telephone systems there is an auxiliary ringer of the electromechanical type in addition to the conventional ringer present in the telephone set. The auxiliary ringer is always connected to the telephone line even when telephone sets are not connected to sockets of the telephone system. The purpose of the auxiliary ringer is to allow a user to recognize an incoming telephone call so as to connect a set to the line in order to reply.

The presence of the auxiliary ringer introduces an acoustic feedback if a user dials a telephone number with a pulse dialer on one of the socket telephone sets connected to the telephone line.

This occurs because when the number is being dialed, the line is suddenly interrupted and reopened for a number of times equal to a number being dialed. The interruption frequency is usually 10 Hz, with an open/close ratio of 1.5–2.

During the dialing of a telephone number, every time the line is opened, the current present on said line drops suddenly to zero and the voltage consequently tends to rise: therefore, overvoltages occur which activate the auxiliary ringer, thus causing acoustic feedback.

There are currently various solutions for eliminating this drawback.

The concept on which all known solutions are based is essentially to limit the voltage present at the terminals of the auxiliary ringer. This limitation must be performed on the transients produced during pulse dialing of a telephone number. On the contrary, when the telephone line is in standby mode or ringing, the auxiliary ringer must be active, therefore when the user is not dialing a telephone number but the telephone set is normally connected to the line and the handset is on-hook, the circuit used for limiting the voltage at the terminals of the auxiliary ringer must be disconnected from the telephone line.

Furthermore, the voltage limiting action must not affect the ordinary call signals when the handset is off-hook and the telephone is being used to communicate with another user.

Among the most common solutions is a connection, by means of an appropriate switch, of a voltage limiter that is constituted by a pair of Zener diodes, mutually connected with their respective anode terminals, and by a connection switch.

If an electronic connection switch is used, there is a problem in that the telephone line does not have a clearly defined polarity and therefore an additional polarization bridge is included, simplifying the execution of the electronic switch.

This solution for eliminating acoustic feedback entails the use of a single Zener diode and of a double bridge.

Finally, another solution is provided by a device including two additional diodes that are connected to a rectifier bridge of the ringer adapted to supply the auxiliary ringer.

The drawback of the above mentioned solutions resides in the difficulty in integrating the acoustic feedback suppression circuits on a single silicon substrate.

SUMMARY OF THE INVENTION

The principal aim of the present invention is therefore to provide an acoustic feedback suppression system capable of eliminating acoustic feedback when dialing a telephone number with a pulse dialer.

Within the scope of this aim, an object of the present invention is to provide an acoustic feedback suppression system capable of limiting the voltage at the terminals of the auxiliary ringer of the telephone line.

Another object of the present invention is to provide an acoustic feedback suppression system that is compact and thus easy to integrate.

Another object of the present invention is to provide a device that is highly reliable, relatively easy to manufacture, and at competitive costs.

This aim, these objects, and others which will become apparent hereinafter are achieved in one embodiment of the present invention by an acoustic feedback suppression system comprising first and second terminals of a telephone line, an internal ringer, and an auxiliary ringer that is connected between said first and said second telephone lines, characterized in that it comprises activation means adapted to activate first and second switching means that reduce the voltage at the terminals of said auxiliary ringer, said activation means being controlled by an activation signal generated by control and signaling means when a user dials a telephone number.

In another embodiment of the present invention, a feedback suppression circuit for suppressing a voltage across an auxiliary ringer of a socket telephone system comprises a first input to couple to a first input of the auxiliary ringer, a second input to couple to the second input of the auxiliary ringer, a third input that receives an activation signal, and a switching circuit, activated by the activation signal, that couples the first input of the feedback suppression circuit to the second input of the feedback suppression circuit to suppress a voltage across the auxiliary ringer.

In another embodiment of the present invention, a method is provided for suppressing a voltage across an auxiliary ringer in a socket telephone system having first and second terminals for respectively coupling to first and second telephone lines. The auxiliary ringer has first and second inputs coupled to the first and second terminals of the socket telephone system. The method includes steps of closing a first switch in response to a detection of a first voltage condition at one of the inputs of the auxiliary ringer to provide a current path for current from the first voltage condition, and closing a second switch in response to a detection of a second voltage condition at the other of the inputs of the auxiliary ringer to provide a current path for current from the second voltage condition.

In yet another embodiment of the present invention, a feedback suppression circuit is provided for a socket telephone system having first and second terminals for respectively connecting to first and second telephone lines, and an auxiliary ringer having first and second inputs coupled to the first and second terminals. The feedback suppression circuit includes a first input to couple to the first input of the auxiliary ringer, a second input to couple to the second input of the auxiliary ringer, a third input that receives an activation signal, and switching means, activated by the activation signal, for coupling the first input of the auxiliary ringer to the second input of the auxiliary ringer to suppress a voltage across the auxiliary ringer.

In still another embodiment of the present invention, a socket telephone system comprises first and second terminals for respectively coupling to first and second telephone lines, an auxiliary ringer having first and second inputs coupled to the first and second terminals, and a feedback suppression circuit. The feedback suppression circuit includes a first input coupled to the first input of the auxiliary ringer, a second input coupled to the second input of the auxiliary ringer, a third input that receives an activation signal, and a switching circuit, activated by the activation signal, that couples the first input of the auxiliary ringer to the second input of the auxiliary ringer to suppress a voltage across the auxiliary ringer.

DETAILED DESCRIPTION

As mentioned, FIGS. 1 to 4 illustrate known solutions.

For the sake of simplicity, the same reference numerals have been used for identical elements in the figures related to the prior art.

Figure 1:
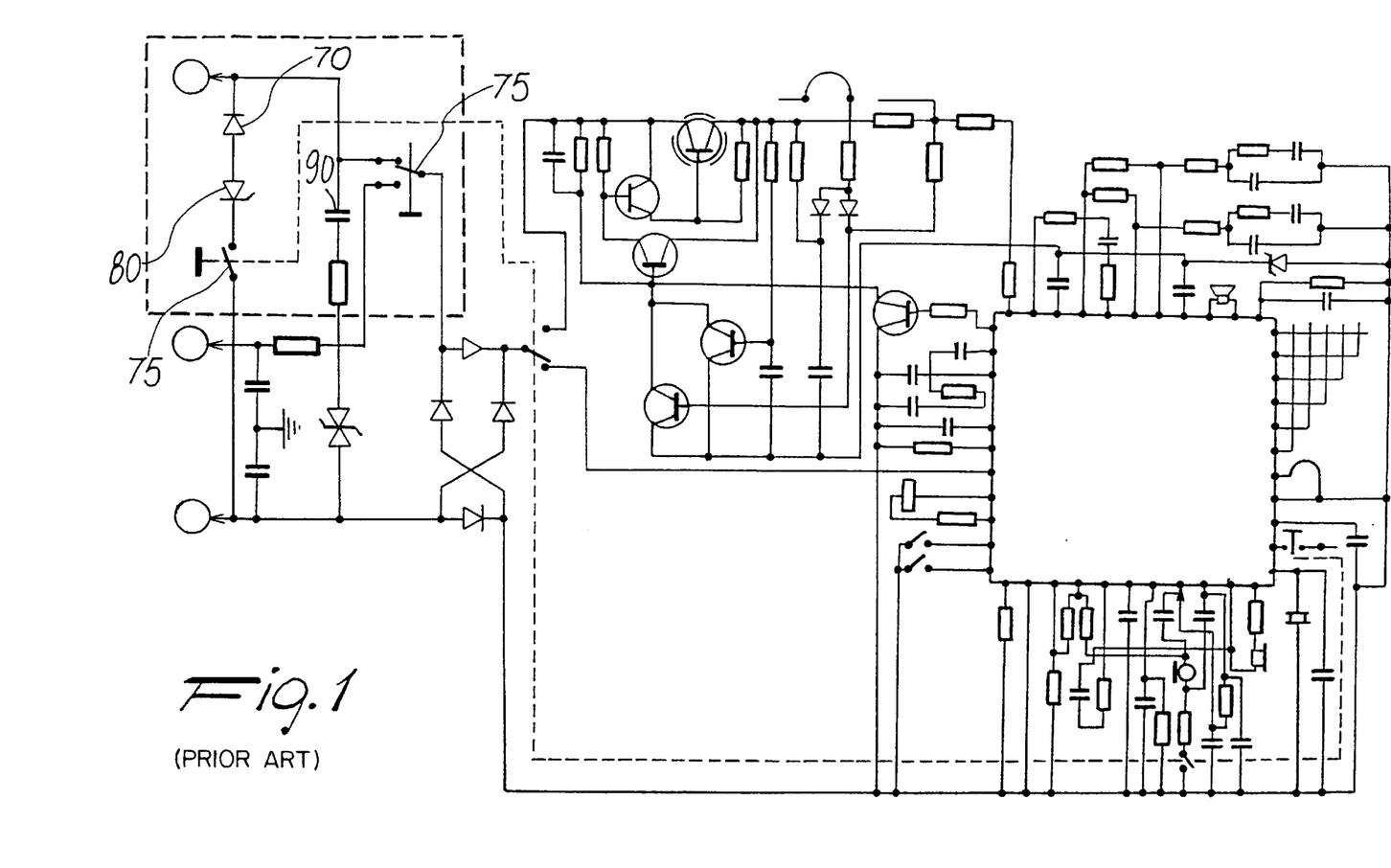
FIG. 1 is a diagram of an acoustic feedback suppression system according to a first known embodiment.

FIG. 1 is a diagram of an embodiment of a known suppression device, wherein the references numerals 70 and 80 designate two Zener diodes mutually connected by their anodes, the reference numeral 90 designates a DC decoupling capacitor, and reference numeral 75 designates mechanical switches.

Figure 2:
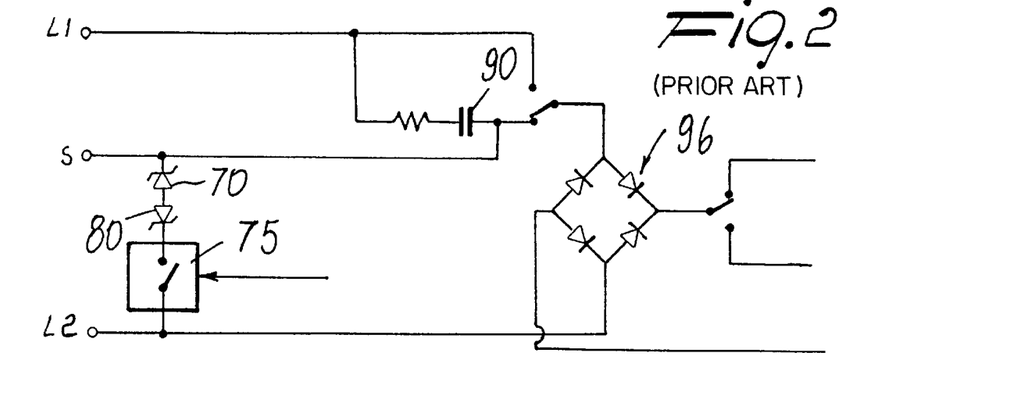
FIG. 2 is a diagram of a detail of the acoustic feedback suppression system shown in FIG. 1.

FIG. 2 is a diagram of a detail of FIG. 1.

Figure 3:
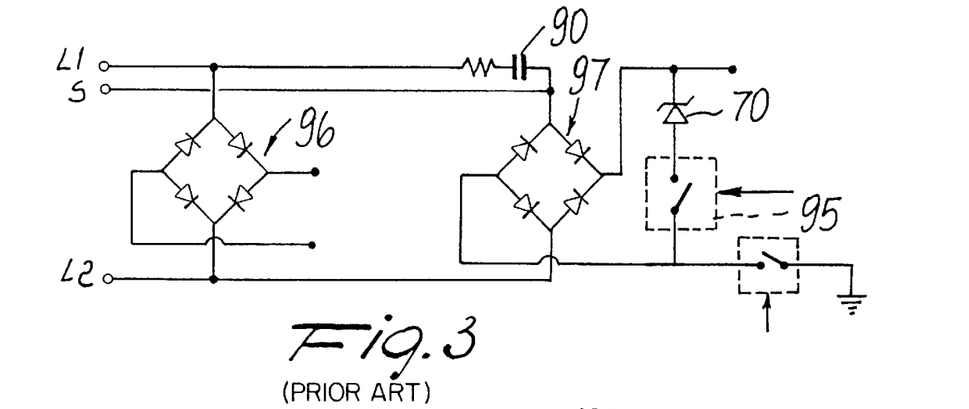
FIG. 3 is a diagram of an acoustic feedback suppression system according to a second known embodiment.

FIG. 3 is a diagram of a further solution, which uses a single Zener diode 70 and two rectifier bridges 96 and 97. The bridge 97 has the purpose of ensuring the polarity of the switches 95.

Figure 4:
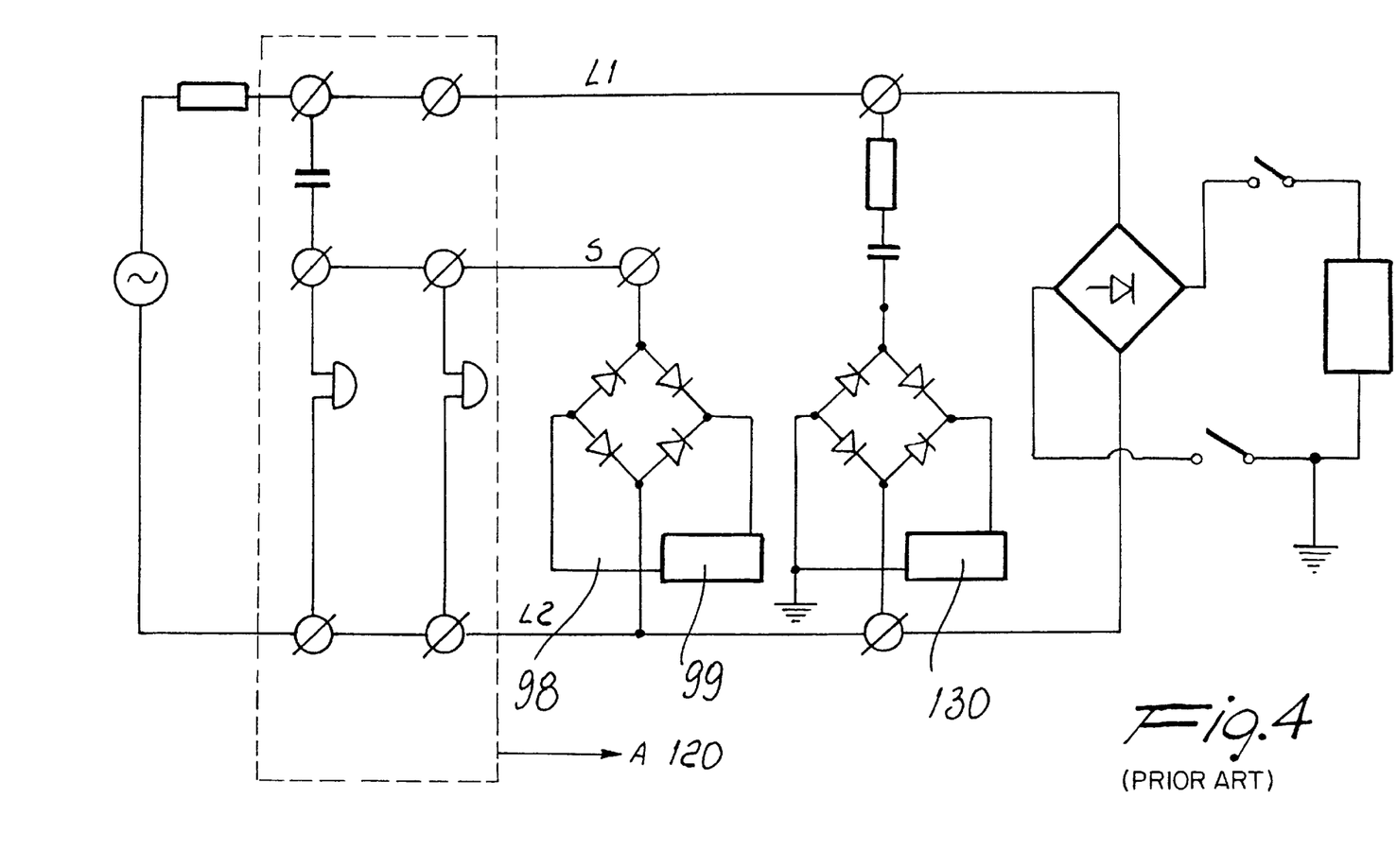
FIG. 4 is a general diagram of the acoustic feedback suppression system shown in FIG. 3.

Finally, FIG. 4 is a diagram of a system solution, showing the connections between the telephone set 120 and the internal ringer 130, with the limiter circuit 98 and 99 connected in parallel.

Figure 5:
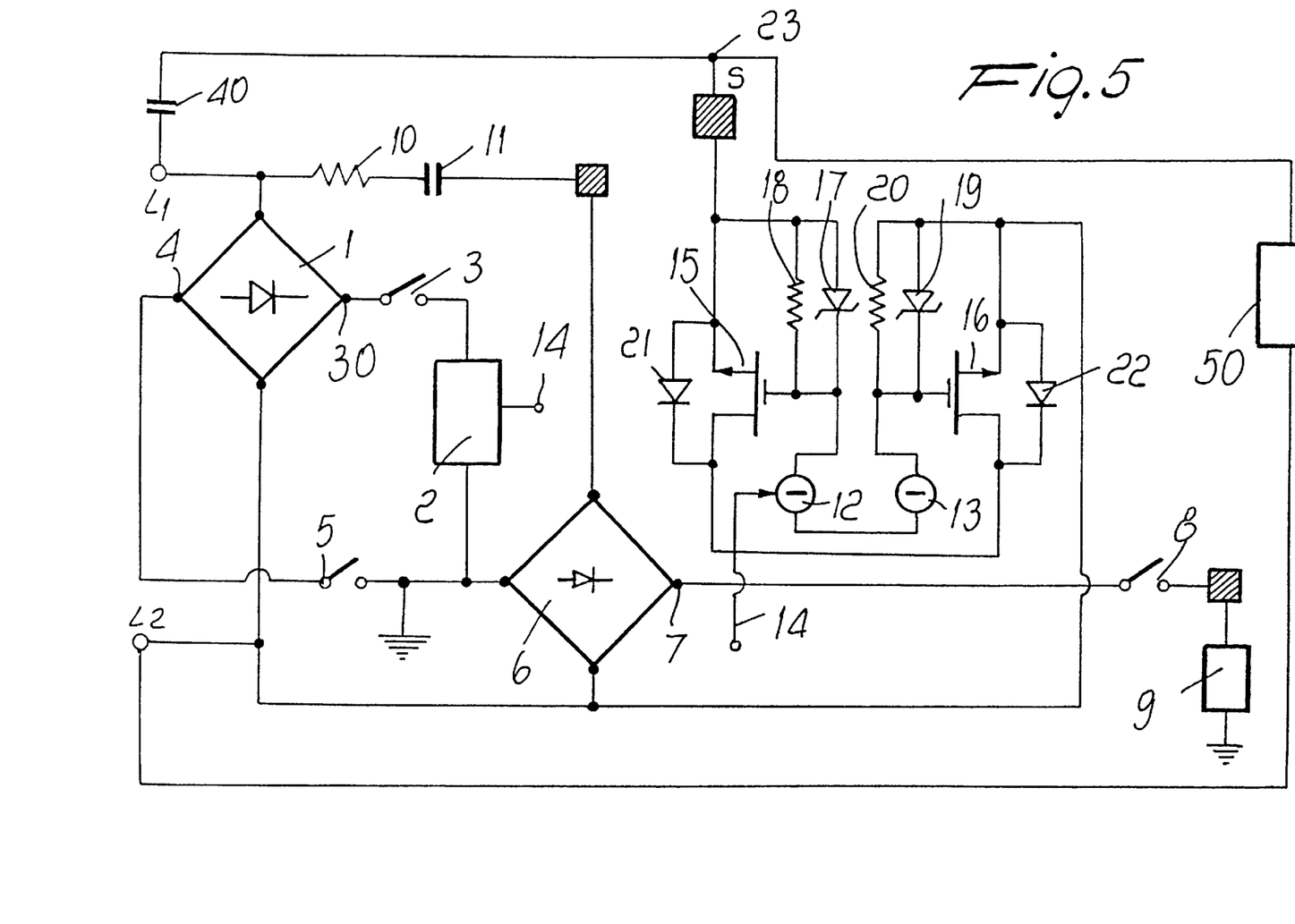
FIG. 5 is a diagram of an acoustic feedback suppression system according to one embodiment of the present invention.

With reference to FIG. 5, the first and the second terminals of the telephone line are designated by L1 and L2 respectively.

A first diode bridge 1 is connected between the first terminal L1 and the second terminal L2. Control and signaling means 2, activated by a first switch 3, are connected to a second terminal 30 of the bridge 1.

A first terminal 4 of the first diode bridge 1 is connected, by means of a second switch 5, to the reference ground of the telephone set (substrate). A second diode bridge 6, known as ringer bridge, is connected to the reference ground with one terminal, and the terminal 7 is connected to the internal ringer 9 of the telephone set by means of a third switch 8.

The second bridge 6 is in turn connected to the first telephone line L1 by interposing an impedance resistor 10 and a first capacitor 11 for decoupling the line from the DC direct component (ringer impedance).

An auxiliary ringer 50 is parallel-connected between the first telephone line L1 and the second telephone line L2, with the interposition of a second decoupling capacitor 40 (connection provided by the socket system as in FIG. 4).

The output signal of the control and signaling means 2 is adapted to drive a circuit portion comprising activation means, which advantageously comprise a first current source 12 and a second current source 13, both of which are driven by the signal present on the line 14 and originating from the control and signaling means 2.

Two mutually symmetrical circuit configurations are arranged in series to the two current sources 12 and 13 and respectively comprise first switching means 15, controlled by the first current source 12, and second switching means 16, controlled by the second current source 13.

The first switching means 15 are provided with a first Zener diode 17 and with a first resistor 18 parallel-connected to said diode 17.

The second switching means 16 are provided with a second Zener diode 19 and with a second resistor 20 parallel-connected to said diode 19.

Advantageously, the first switching means 15 and the second switching means 16 can be provided by means of MOS devices.

The first and second resistors have the purpose of keeping the two MOS devices off, since the voltage $V_{GS}$ between the gate and the source is shorted through said two resistors.

The first Zener diode 17 and the second Zener diode 19 therefore have the purpose of providing protection for the voltage $V_{GS}$ between the gate and the source of the two MOS devices, preventing damage of the gate terminals of the MOS devices.

The first MOS device 15 has a first intrinsic diode 21 and the second MOS device 16 has a second intrinsic diode 22.

The source of the first MOS device 15 is connected to a branch 23 (the above mentioned terminal S; hereinafter, reference will be made to the terminal S), which is connected to the line of the auxiliary ringer 50, parallel-connected to L1.

The source of the second MOS device 16 is instead connected to the line L2 and to the other terminal of the auxiliary ringer 50.

The drain of the first MOS device 15 is connected to the drain of the second MOS device 16.

The gate of the first MOS device 15 is connected to the first current source 12 and the gate of the second MOS device 16 is connected to the second current source 13.

The MOS devices 15 and 16 are advantageously N-channel MOS devices.

Conveniently, the control and signaling means 2 are constituted by a so-called call circuit and by a microprocessor adapted to generate an activation command when a telephone number is pulse-dialed by the user. The activation command is thus sent along the branch 14 to activate the current sources 12 and 13.

The circuit portion comprising the two current sources 12 and 13, the two MOS devices 15 and 16, and the respective diodes and resistors 17, 18 and 19, 20 has no effect on the telephone line and is active only when the microprocessor included in the control and signaling means 2 sends the activation signal.

The first switch 3, the second switch 5, and the third switch 8 are all electronic switches activated initially by an electromechanical switch (not shown) operated by the handset of the telephone set.

Figure 6:
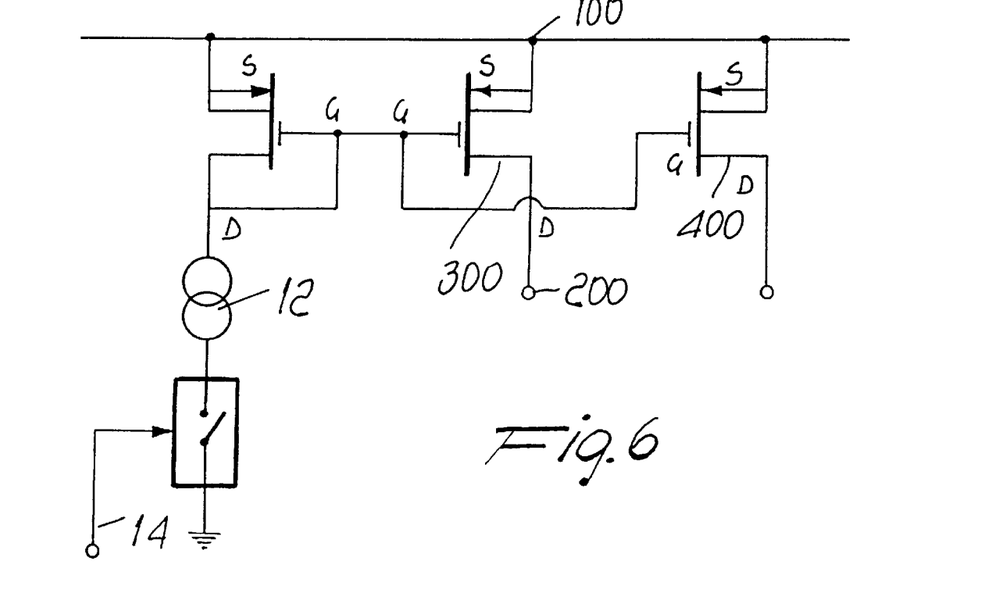
FIG. 6 is a diagram of the execution of the current sources of the acoustic feedback suppression circuit according to one embodiment of the present invention.

FIG. 6 is a diagram of the circuital embodiment of the two current sources, in which mirroring transistors 300 and 400 of the P-channel type are used.

With reference to FIGS. 5 and 6, the operation of the acoustic feedback suppression system according to the invention is as follows.

When a user lifts the handset to dial a telephone number, he enters the call/number dialing mode and the switches 3 and 5 are closed. When the user then dials a telephone number, the first switch 3 opens and alternately closes the line, and the control and signaling means 2 generate the activation signal to drive the two current sources 12 and 13.

In the ringer condition, that is to say, when the handset is lowered, the first switch 3 and the second switch 5 are both open and the third switch 8 is closed to enable the internal ringer 9. In this case, the auxiliary ringer 50 is also enabled.

It should be noted that the signal present on the telephone line during the ringing step is a sinusoidal signal the frequency whereof differs from country to country but is generally 50 Hz.

Two cases can therefore occur: in the first case, the voltage present on the branch 23 (terminal S) that is connected to the first terminal L1 of the telephone line is positive with respect to the voltage present on the second terminal L2; in the second case, the opposite situation occurs, depending on the DC polarity of the telephone line.

The voltage level of the power supply of the current sources 12 and 13 must always be the maximum voltage of the circuit, otherwise said current sources cannot supply the required current. In this regard, reference should be made to FIG. 6, which is a circuit diagram of the current sources. It is evident that if the voltage present on the node 100 were equal to the voltage present on the node 200, the P-channel MOS device that is part of the current mirror would be off.

In order to always obtain the maximum voltage, an OR circuit (not shown in the figures), provided by means of diodes, is present in the circuit according to the invention between the voltage present at the second terminal 30 of the first diode bridge 1 and the voltage present on the branch 23 that is connected to the terminal of the auxiliary ringer 50.

If the voltage on L1 and therefore on the branch 23 is positive with respect to the voltage on L2, the activation signal enables both current sources 12 and 13, but the current source 12 is off and is unable to supply current to the resistor 18 because the source is connected to the maximum voltage (the branch 23, in the specific case), which coincides with the other terminal of the resistor 18, so that the MOS device 15 is off and therefore the intrinsic diode 21 is forward biased and the intrinsic diode 22 is reverse biased.

The current then flows in the mirror-symmetrical part of the circuit, the second current source 13 is on, and the current flows in the second resistor 20.

The voltage drop across the second resistor 20 causes the second MOS device 16 to conduct. For this to occur, the voltage drop across the second resistor 20, which is determined by multiplying the current by the value of said resistor, must be greater than the voltage $V_{GS}$ between the gate and the source of the second MOS device 16.

The activation of the second MOS device 16 causes a reduction in the voltage between the terminal S and the second terminal L2 of the telephone line, where the auxiliary ringer 50 is connected.

Said voltage reduction between S and L2 therefore causes the deactivation of the auxiliary ringer and the consequent suppression of the acoustic feedback.

If instead the voltage on the first terminal L1 of the line is negative with respect to the voltage on the second terminal of the line, the circuit behaves in a mirror-symmetrical manner, so that this time the MOS device 15 is on and the source 13 is off, providing in a similar manner the reduction in voltage between the two terminals S and L2 of the auxiliary ringer 50.

In practice, it has been observed that the device according to the invention fully achieves the intended aim and objects, since it allows to suppress acoustic feedback, limiting the voltage across the auxiliary ringer when a user dials the desired telephone number with a pulse dialer. The device according to the invention does not affect the telephone line in all other cases, that is to say, when the auxiliary ringer must be active and when the telephone is in the call mode, in which the control and signaling means 2 do not send the activation signal to the two current sources 12 and 13.

Furthermore, the use of electronic switches including intrinsic diodes allows a reduction in area and greater compactness, and these are important requirements for integration.

The device thus conceived is susceptible of numerous modifications and variations, all of which are within the scope of the inventive concept; all the details may furthermore be replaced with other technically equivalent elements.

In practice, the materials employed, so long as they are compatible with the specific use, as well as the dimensions, may be any according to the requirements and the state of the art.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the claims and the equivalents thereto.

What is claimed is:

1. An acoustic feedback suppression system in a socket telephone system comprising:

a first and a second terminal to respectively couple to first and second telephone lines;

an internal ringer;

an auxiliary ringer connected between the first and the second telephone terminals;

first switching means for reducing a voltage across the auxiliary ringer;

second switching means for reducing a voltage across the auxiliary ringer;

activation means for activating the first and second switching means to reduce a voltage across the auxiliary ringer, the activation means being controlled by an activation signal generated by control and signaling means when a user dials a telephone number.

2. An acoustic feedback suppression system in a socket telephone system comprising:

a first and a second terminal to respectively couple to first and second telephone lines;

an internal ringer;

an auxiliary ringer connected between the first and the second telephone terminals;

first switching means for reducing a voltage across the auxiliary ringer;

second switching means for reducing a voltage across the auxiliary ringer;

activation means for activating the first and second switching means to reduce a voltage across the auxiliary ringer, the activation means being controlled by an activation signal generated by control and signaling means when a user dials a telephone number;

a first rectifier bridge coupled to the first and second terminals; and a switch disposed between the control and signaling means and the first rectifier bridge.

3. An acoustic feedback suppression system in a socket telephone system comprising:

a first and a second terminal to respectively couple to first and second telephone lines;

an internal ringer;

an auxiliary ringer connected between the first and the second telephone terminals;

first switching means for reducing a voltage across the auxiliary ringer;

second switching means for reducing a voltage across the auxiliary ringer;

activation means for activating the first and second switching means to reduce a voltage across the auxiliary ringer, the activation means being controlled by an activation signal generated by control and signaling means when a user dials a telephone number;

wherein the activation means includes first and second current sources that can be activated by the activation signal originating from the control and signaling means.

4. The suppression system of claims 2 or 3 wherein the first switching means includes a first switch and the second switching means includes a second switch.

5. The suppression system of claim 4, wherein each of the first switch and the second switch includes a MOS device.

6. The suppression system of claim 5, wherein each of the MOS devices includes an intrinsic diode.

7. The suppression system of claim 5, further comprising first and second Zener diodes respectively coupled to the MOS devices of the first and second switches, and first and second resistors respectively connected in parallel with the first and second Zener diodes.

8. The suppression system of claim 5, wherein each of the MOS transistors has a gate terminal, the gate terminal of the MOS transistor of the first switch being connected to said first current source and the gate terminal of the MOS transistor of the second switch being connected to said second current source.

9. The suppression system of claim 5, wherein each of the MOS transistors has a drain terminal, and wherein the drain terminal of said MOS transistor of the first switch is connected to the drain terminal of the MOS transistor of the second switch.

10. The suppression system of claim 5, wherein each of the MOS transistors has a source terminal, and wherein the source terminal of the MOS device of the first switch is connected to said first terminal of the telephone line and the source terminal of the MOS device of the second switch is connected to said second terminal of the telephone line.

11. An acoustic feedback suppression system in a socket telephone system comprising:

a first and a second terminal to respectively couple to first and second telephone lines;

an internal ringer;

an auxiliary ringer connected between the first and the second telephone terminals;

first switching means for reducing a voltage across the auxiliary ringer;

second switching means for reducing a voltage across the auxiliary ringer;

activation means for activating the first and second switching means to reduce a voltage across the auxiliary ringer, the activation means being controlled by an activation signal generated by control and signaling means when a user dials a telephone number;

wherein the control and signaling means includes a microprocessor configured to generate said activation signal.

12. In a socket telephone system having first and second terminals for respectively coupling to first and second telephone lines, and an auxiliary ringer having first and second inputs coupled to the first and second terminals, a feedback suppression circuit for suppressing a voltage across the auxiliary ringer comprising:

a first input to couple to the first input of the auxiliary ringer;

a second input to couple to the second input of the auxiliary ringer;

a third input that receives an activation signal; and a switching circuit, activated by the activation signal, that couples the first input of the feedback suppression circuit to the second input of the feedback suppression circuit to suppress a voltage across the auxiliary ringer, the switching circuit including first and second switches each having a control input and first and second terminals, the first and the second terminals of the first switch being coupled in a first current path between the first and the second inputs of the suppression circuit, and the first and the second terminals of the second switch being coupled in a second current path between the first and the second inputs of the suppression circuit.

13. The suppression circuit of claim 12, wherein each of the first and second switches has an on state and an off state, such that when one of the switches is in the on state, a substantially open circuit is provided from the first terminal to the second terminal of the one of the switches and when the one of the switches is in the off state a substantially open circuit is provided from the first terminal to the second terminal of the one of the switches.

14. The suppression circuit of claim 13, wherein the switching circuit is arranged such that upon activation by the activation signal, the first switch is set for the on state when a voltage at the first input of the suppression circuit is less than a first predetermined value, and the second switch is set for the on state when a voltage at the second terminal of the suppression circuit is less than a second predetermined value, the switching circuit thereby suppressing a voltage across the first and second inputs of the auxiliary ringer.

15. The suppression circuit of claim 14, wherein the switching circuit further includes an activation circuit that receives the activation signal and in response to a value of the activation signal activates the first and second switches.

16. The suppression circuit of claim 15, wherein the activation circuit includes first and second current sources having outputs to respectively provide a first current signal and a second current signal in response to the value of the activation signal.

17. The suppression circuit of claim 16, wherein each of the first and second switches includes a MOS transistor having a gate coupled to the output of a respective one of the first and second current sources.

18. The suppression circuit of claim 17, wherein the switching circuit further includes first and second resistors, the first resistor being coupled between the gate of the MOS transistor of the first switch and the first input of the suppression circuit, the second resistor being coupled between the gate of the MOS transistor of the second switch and the second input of the suppression circuit.

19. The suppression circuit of claim 18, wherein each one of the MOS transistors has an intrinsic diode coupled between the first and second terminals of the MOS transistors.

20. A method for suppressing a voltage across an auxiliary ringer in a socket telephone system having first and second terminals for respectively coupling to first and second telephone lines, the auxiliary ringer having first and second inputs coupled to the first and second terminals of the socket telephone system, the method including steps of:

closing a first switch in response to a detection of a first voltage condition at one of the inputs of the auxiliary ringer to provide a current path for current from the first voltage condition; and closing a second switch in response to a detection of a second voltage condition at the other of the inputs of the auxiliary ringer to provide a current path for current from the second voltage condition.

21. The method of claim 20, further comprising steps of:

activating the closing of the first and the second switches in response to a first value of a control signal; and deactivating the closing of the first and the second switches in response to a second value of the control signal.

22. The method of claim 21, wherein the step of activating the closing is performed in response to the socket telephone system entering a dialing mode of operation.

23. The method of claim 22, wherein the step of deactivating the closing is performed in response to the socket telephone system exiting the dialing mode of operation.

24. The method of claim 20, wherein the first and the second voltage condition are each an impulse voltage condition caused by a user dialing a number on the socket telephone system.

25. In a socket telephone system having first and second terminals for respectively coupling to first and second telephone lines, and an auxiliary ringer having first and second inputs coupled to the first and second terminals, a feedback suppression circuit comprising:

a first input to couple to the first input of the auxiliary ringer;

a second input to couple to the second input of the auxiliary ringer;

a third input that receives an activation signal; and first switching means, activated by the activation signal, for coupling the first input of the auxiliary ringer to the second input of the auxiliary ringer through a first current path to suppress a voltage of a first polarity across the auxiliary ringer;

second switching means, activated by the activation signal, for coupling the first input of the auxiliary ringer to the second input of the auxiliary ringer through a second current path to suppress a voltage of a second polarity across the auxiliary ringer.

26. The suppression circuit of claim 25, wherein the first switching means includes a first switch and the second switching means includes a second switch respectively coupled in the first and second current paths, and wherein each of the first and second switches has first and second terminals and a control terminal, and wherein each of the first and second switches has an on state and an off state, such that when one of the switches is in the on state, a substantially open circuit is provided from the first terminal to the second terminal of the one of the switches and when the one of the switches is in the off state, a substantially open circuit is provided from the first terminal to the second terminal of the one of the switches.

27. The suppression circuit of claim 26, wherein the first switching means includes means for setting the first switch to the on state when a voltage at the first input of the suppression circuit is less than a first predetermined value, and the second switching means includes means for setting the second switch to the on state when a voltage at the second terminal of the suppression circuit is less than a second predetermined value.

28. The suppression circuit of claim 27, further comprising activation means for activating the first and second switches in response to the activation signal.

29. A socket telephone system comprising:

first and second terminals for respectively coupling to first and second telephone lines;

an auxiliary ringer having first and second inputs coupled to the first and second terminals; and a feedback suppression circuit including;

a first input coupled to the first input of the auxiliary ringer;

a second input coupled to the second input of the auxiliary ringer;

a third input that receives an activation signal; and a switching circuit, activated by the activation signal, that couples the first input of the feedback suppression circuit to the second input of the feedback suppression circuit to suppress a voltage across the auxiliary ringer, the switching circuit including first and second switches each having a control input and first and second terminals, the first and the second terminals of the first switch being coupled in a first current path between the first and the second inputs of the suppression circuit, and the first and the second terminals of the second switch being coupled in a second current path between the first and the second inputs of the suppression circuit.

30. The socket telephone system of claim 29, wherein each of the first and second switches has an on state and an off state, such that when one of the switches is in the on state, a substantially open circuit is provided from the first terminal to the second terminal of the one of the switches and when the one of the switches is in the off state a substantially open circuit is provided from the first terminal to the second terminal of the one of the switches.

31. The socket telephone system of claim 30, wherein the switching circuit is arranged such that upon activation by the activation signal, the first switch is set for the on state when a voltage at the first input of the suppression circuit is less than a first predetermined value, and the second switch is set for the on state when a voltage at the second terminal of the suppression circuit is less than a second predetermined value, the switching circuit thereby suppressing a voltage across the first and second inputs of the auxiliary ringer.

32. The socket telephone system of claim 31, wherein the switching circuit further includes an activation circuit that receives the activation signal and in response to a value of the activation signal activates the first and second switches.

33. The socket telephone system of claim 32, wherein the activation circuit includes first and second current sources having outputs to provide a first current signal and a second current signal in response to the value of the activation signal.

34. The socket telephone system of claim 33, wherein each of the first and second switches includes a MOS transistor having a gate coupled to the output of a respective one of the first and second current sources.

35. The socket telephone system of claim 34, wherein the switching circuit further includes first and second resistors, the first resistor being coupled between the gate of the MOS transistor of the first switch and the first input of the suppression circuit, the second resistor being coupled between the gate of the MOS transistor of the second switch and the second input of the suppression circuit.

36. The socket telephone system of claim 35, wherein each one of the MOS transistors has an intrinsic diode coupled between the first and second terminals of the MOS transistors.

37. The socket telephone system of claim 36, further comprising a control and signaling circuit having first and second inputs and an output coupled to the third input of the feedback suppression circuit to provide the activation signal.

38. The socket telephone system of claim 37, further comprising a rectifier circuit having first and second inputs respectively coupled to the first and second terminals of the socket telephone system and having first and second outputs respectively coupled to the first and second inputs of the control and signaling circuit.

39. The socket telephone system of claim 29, further comprising a control and signaling circuit having first and second inputs and an output coupled to the third input of the feedback suppression circuit to provide the activation signal.

40. The socket telephone system of claim 39, further comprising a rectifier circuit having first and second inputs respectively coupled to the first and second terminals of the socket telephone system and having first and second outputs respectively coupled to the first and second inputs of the control and signaling circuit.

41. A method for suppressing a voltage across an auxiliary ringer in a socket telephone system having first and second terminals for respectively coupling to first and second telephone lines, the auxiliary ringer having first and second inputs coupled to the first and second terminals of the socket telephone system, the method including steps of:
   providing a current path between the first and second terminals of the auxiliary ringer, wherein the current path includes first and second oppositely connected diodes;
   bypassing the first diode in response to a detection of a first voltage condition; and
   bypassing the second diode in response to a detection of a second voltage condition.

42. The method of claim 41, further comprising steps of:
   enabling the bypassing of the first and second diodes in response to a first value of a control signal;
   disabling the bypassing of the first and second diodes in response to a second value of a control signal.

43. The method of claim 42, wherein the step of enabling is performed in response to the socket telephone system entering a dialing mode of operation.

44. The method of claim 43, wherein the step of disabling is performed in response to the socket telephone system exiting the dialing mode of operation.

45. The method of claim 41, wherein the first and second voltage conditions are caused by a user dialing a number on the socket telephone system.

46. The method of claim 20, wherein the first and second switches reduce an AC component of the voltage across the auxiliary ringer.

47. The method of claim 20, wherein the first and second switches are current-driven.

48. The method of claim 41, wherein the bypassing of the first diode and the bypassing of the second diode reduce an AC component of the voltage across the auxiliary ringer.

49. The method of claim 41, wherein the bypassing of the first diode and the bypassing of the second diode are current-driven.

50. The suppression system of claim 4, wherein the first and second switches reduce an AC component of the voltage across the auxiliary ringer.

51. The suppression system of claim 4, wherein the first and second switches are current-driven.

* * * * *